(12) United States Patent
Shin et al.

(10) Patent No.: US 8,825,600 B2
(45) Date of Patent: Sep. 2, 2014

(54) FILE BACKUP APPARATUS AND METHOD FOR BACKING UP ONE OR MORE DIRECTORIES

(75) Inventors: Soon-Churl Shin, Ansan-si (KR); Sang-Moon Lee, Seoul (KR); Woo-Jin Yang, Incheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/090,203

(22) Filed: Apr. 19, 2011

(65) Prior Publication Data
US 2012/0011099 A1 Jan. 12, 2012

(30) Foreign Application Priority Data
Jul. 8, 2010 (KR) .................. 10-2010-0065913

(51) Int. Cl.
*G06F 17/30* (2006.01)

(52) U.S. Cl.
USPC .......................................... 707/640; 707/661

(58) Field of Classification Search
USPC ................................. 707/640, 661
See application file for complete search history.

(56) References Cited

U.S. PATENT DOCUMENTS

| | | | |
|---|---|---|---|
| 5,522,037 A | 5/1996 | Kitagawa et al. | |
| 5,559,991 A | 9/1996 | Kanfi | |
| 7,092,976 B2 | 8/2006 | Curran et al. | |
| 7,500,246 B2 | 3/2009 | Saake et al. | |
| 7,613,750 B2 | 11/2009 | Valiyaparambil et al. | |
| 7,653,624 B1* | 1/2010 | Reitmeyer et al. | 707/646 |
| 7,756,833 B2 | 7/2010 | Van Ingen et al. | |
| 8,060,476 B1* | 11/2011 | Afonso et al. | 707/649 |
| 2002/0147733 A1* | 10/2002 | Gold et al. | 707/200 |
| 2004/0133608 A1 | 7/2004 | Saake et al. | |
| 2005/0193031 A1* | 9/2005 | Midgley et al. | 707/200 |
| 2006/0026218 A1 | 2/2006 | Urmston | |
| 2007/0027935 A1* | 2/2007 | Haselton et al. | 707/204 |
| 2007/0038884 A1* | 2/2007 | Campbell et al. | 714/4 |
| 2007/0150679 A1* | 6/2007 | Feinberg et al. | 711/162 |
| 2008/0104145 A1* | 5/2008 | Lipman et al. | 707/204 |
| 2008/0140963 A1 | 6/2008 | Thomason et al. | |
| 2010/0132022 A1* | 5/2010 | Venkatasubramanian | 726/7 |
| 2010/0274763 A1 | 10/2010 | Ingen et al. | |
| 2010/0287140 A1* | 11/2010 | Oza | 707/640 |

FOREIGN PATENT DOCUMENTS

| | | |
|---|---|---|
| KR | 10-2005-0001304 | 1/2005 |
| KR | 10-2005-0030883 | 3/2005 |
| KR | 10-2006-0050742 | 5/2006 |
| KR | 10-2006-0050742 | 7/2008 |
| KR | 10-2008-0067054 | 7/2008 |
| KR | 10-2009-0014281 | 2/2009 |

* cited by examiner

*Primary Examiner* — Son T Hoang (74) *Attorney, Agent, or Firm* — NSIP Law (57) ABSTRACT

A file backup apparatus and method estimates whether a file has been changed in a directory based on directory property information, and backs up the directory which includes a changed file according to the estimation result.

14 Claims, 7 Drawing Sheets

FILE BACKUP APPARATUS AND METHOD FOR BACKING UP ONE OR MORE DIRECTORIES

CROSS-REFERENCE TO RELATED APPLICATION

This application claims the benefit under 35 U.S.C. §119 (a) of Korean Patent Application No. 10-2010-0065913, filed on Jul. 8, 2010, the entire disclosure of which is incorporated herein by reference for all purposes.

BACKGROUND

1. Field

The following description relates to a file backup apparatus and method.

2. Description of the Related Art

File backup generally involves temporarily duplicating and storing data in case an unexpected loss or corruption of the data occurs. In file backup, incremental backup or differential backup has been generally applied to determine changed data and then selectively back up the changed data.

As the capacity of data storage devices increases, the amount of data to be backed up increases as well. Thus, it may take more time to determine which data should be backed up.

Therefore, improved techniques to enable faster searching for data to be backed up and performing backup are desirable.

SUMMARY

The following description relates to a multiprocessor apparatus and method for increasing a parallel processing speed. In addition, the following description relates to a multiprocessor apparatus and method for increasing a speed of parallel processing data having a multi-layer structure.

In one general aspect, there is provided a file backup apparatus for backing up one or more directories including an estimation unit to estimate whether a file has been changed in a directory based on directory property information, and a backup unit to back up the directory if the directory is estimated to have its file changed.

The backup unit may further back up a directory if the directory has not been backed up for a predefined period of time.

The file backup apparatus may further include an update unit to update the directory property information.

Each time the estimation unit estimates that a file is changed in a directory, the backup unit may back up the directory which is estimated to have its file changed.

The estimation unit may further estimate whether a file has been changed in each directory, and the backup unit may back up all directories that are estimated to have their files changed.

The directory property information may include at least one selected from the group of directory list information, directory access information, directory change information, directory backup history information, and any combination thereof.

The estimation unit may estimate whether a file has been changed in all directories prior to the backup unit backing up directories that are estimated to have their files changed.

If it is estimated that a file has been changed in a first directory, the first directory may be backed up by the backup unit before the estimation unit estimates whether a file has been changed in a second directory.

In another general aspect, there is provided a file backup method for backing up one or more directories including estimating whether a file has been changed in a directory based on directory property information, and backing up the directory if the directory is estimated to have its file changed.

The backing up of the directory may include backing up a directory if the directory has not been backed up for a predefined period of time.

The file backup method may further include updating the directory property information.

The backing up may include backing up a directory each time it is estimated that a file in the directory has been changed.

The estimating may include estimating whether a file has been changed in each directory, and the backing up may include backing up directories that are estimated to have their files changed.

The directory property information may include at least one selected from the group of directory list information, directory access information, directory change information, directory backup history information, and any combination thereof.

The estimating may further include estimating whether a file has been changed in all directories, prior to backing up directories that are estimated to have their files changed.

If it is estimated that a file has been changed in a first directory, the first directory may be backed up before estimating whether a file has been changed in a second directory.

In another general aspect, there is provided a file backup apparatus including an estimation unit configured to determine whether directory property information of a directory has been changed, and a back up unit configured to back up a directory based on the changed directory property information.

The backup unit may back up the directory if the directory property information has not been changed for a predefined period of time.

The file backup apparatus may further include an update unit to update the directory property information.

The directory property information includes at least one selected from the group of directory list information, directory access information, directory change information, directory backup history information, and any combination thereof.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining an understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
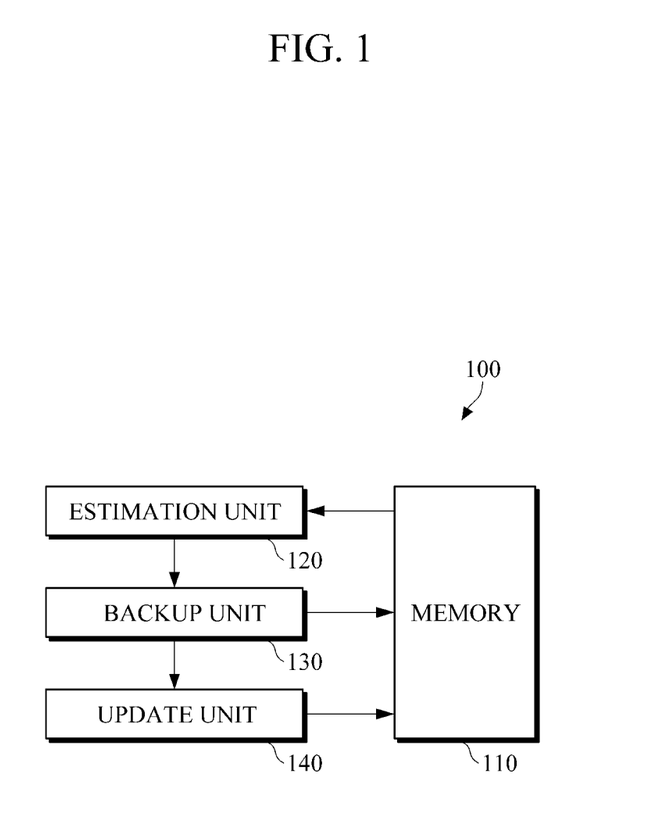
FIG. 1 is a diagram illustrating an example of a file backup apparatus.

FIG. 1 illustrates an example of a file backup apparatus. Referring to the example illustrated in FIG. 1, the file backup apparatus 100 includes a memory 110, an estimation unit 120, a backup unit 130, and an update unit 140.

The memory 110 stores a plurality of directories. A directory may include a plurality of files and sub-directories. The directory may also be referred to as a catalog or a folder. In addition, the memory 110 may include directory property information. The directory property information may include information such as directory list information, directory access information, directory change information, directory backup history information, and the like. The directory list information may include a list of directories stored in the memory 110. The directory access information may include time information about when a user accesses a computer, when the user accesses each directory, and when a process that can cause a change in one or more files present in each directory accesses the directory. The directory change information may include information about a change of a directory's name and change of a directory's location. The directory backup history information may include information about whether or not each directory has been backed up and time information about when the backup was performed.

The memory 110 includes computer-readable storage media. Examples of computer-readable storage media include a multimedia card micro type memory, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and the like.

The estimation unit 120 extracts directory property information from the memory 110. The estimation unit 120 estimates whether a file has been changed in the directory based on the extracted directory property information.

For example, if a time when a process that can cause a change in one or more files of a directory falls within a predefined time range, the estimation unit 120 may estimate that the one or more files of the directory are changed. Here, various periods of time, such as five hours, one day, a week, and the like, may be set by a user as the time range.

As another example, if a time when a user accesses a directory falls within a predefined time range, the estimation unit 120 may estimate that one or more files of the directory are changed.

As yet another example, if the time when a file of a directory is changed falls within a predefined time range, the estimation unit 120 may estimate that the file of the directory is changed.

As such, the estimation unit 120 may use all or some of the directory property information to estimate whether a file has been changed in the directory.

When the estimation unit 120 estimates that a file has been changed, the backup unit 130 may back up a directory that includes the changed file. Backed-up data may be stored in the memory 110. In contrast, the backup unit 130 may not back up the directory if the estimation unit 120 estimates that a file in the directory has not been changed.

The backup unit 130 backs up a directory if the estimation unit 120 estimates that a file of the directory is changed. As an example, if there are three directories and the estimation unit 130 estimates that the first directory has a file changed, the backup unit 130 may back up the first directory. Then, if the estimation unit 120 estimates that the second directory has no file changed, the backup unit 130 may not back up the second directory. Finally, if the estimation unit 120 estimates that the third directory has a file changed, the backup unit 130 may back up the third directory. It is noted that the estimation unit 120 may not necessarily perform estimations on the directories in a sequential order.

The backup unit 130 backs up directories which are estimated to have a file changed after the estimation unit 120 estimates whether a file has been changed in each directory. For example, the estimation unit 120 may estimate that the first directory has a file changed, the second directory has no file changed, and the third directory has a file changed, and subsequently the backup unit 130 may back up the first and third directories.

The backup unit 130 may determine that a directory that has not been backed up for a predefined period of time based on the directory property information. Accordingly, the backup unit 130 may back up the directory that has not been backed up for the predefined period of time. For example, if the predefined period of time is two days, the backup unit 130 may determine directories which have not been backed up for two days among a number of directories, and back up the determined directories.

The update unit 140 updates directory property information. For example, if a directory is backed up by the backup unit 130, the update unit 140 may store directory information of the backed-up directory and time information of when the backup was performed (e.g., directory property information) in the memory 110.

The update unit 140 may update the directory property information and store the updated information in the memory 110 at regular intervals.

The file backup apparatus may search for target directories to be backed up on a directory-by-directory basis, thereby reducing time spent searching for backup target data.

In addition, by reducing time spent searching for backup target data, the file backup apparatus facilitates an overall reduction in data backup time.

Moreover, the file backup apparatus may back up a directory which has not been backed up for a predefined period of time. Accordingly, a directory can be prevented from being backed up for an extended period of time, such as a case where the directory is estimated to have no file changed even though there is actually a file changed in the directory.

Figure 2:
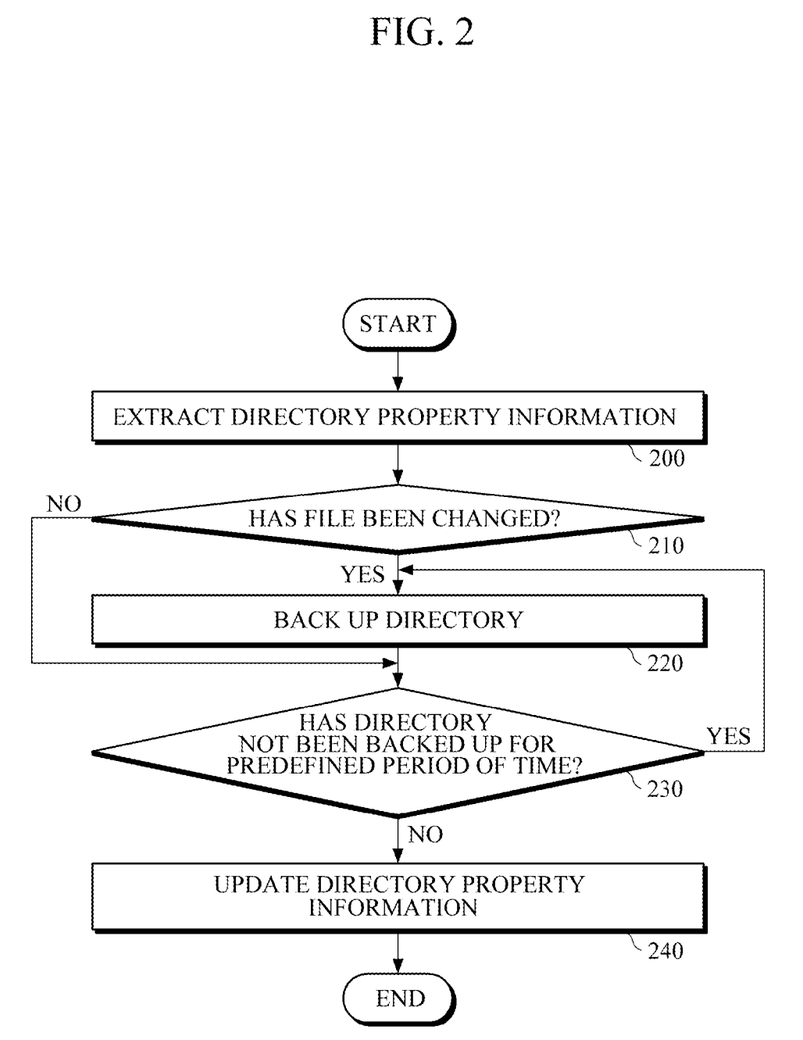
FIG. 2 is a flowchart illustrating of an example of a file backup method.

FIG. 2 illustrates a flowchart of an example of a file backup method. Referring to the examples illustrated in FIGS. 1 and 2, the file backup apparatus 100 extracts directory property information from the memory 110 (200). The file backup apparatus 100 estimates whether a file has been changed in the directory based on the extracted directory property information (210). If it is estimated that a file in the directory has been changed, the file backup apparatus 100 backs up the directory including the changed file (220). Further, file backup apparatus 100 may determine that a directory has not been backed up for a predefined period of time, based on the directory property information. Accordingly, the file backup apparatus 100 may back up the directory which has not been backed up for the predefined period of time (230). Finally, the file backup apparatus 100 updates the directory property information (240). In this case, the directory property information may include backed-up directory information, intact directory information (i.e., for a directory which has not been updated yet), and backed-up time information.

According to the above file backup method, a target directory to be backed up is searched for on a directory-by-directory basis, and thus searching time for directories to be backed up can be reduced.

In addition, by reducing searching time for directories to be backed up, the above file backup method can reduce overall data backup time.

Furthermore, the file backup method backs up directories which have not been backed up for a predefined period of time, and thus can prevent a directory from being excluded from being backed up for an extended period of time.

Figure 3:
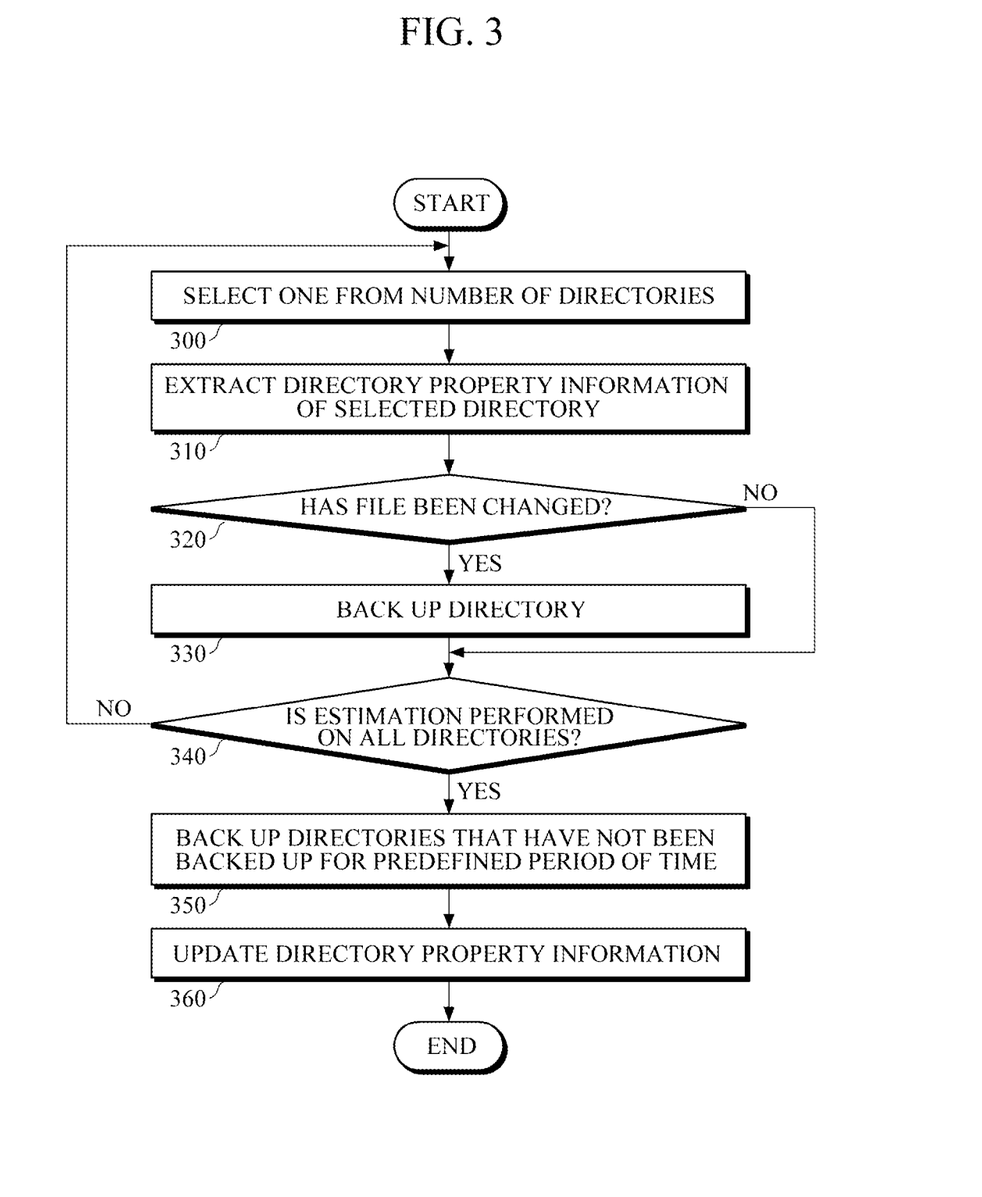
FIG. 3 is a flowchart illustrating of another example of the file backup method.

FIG. 3 illustrates a flowchart of another example of the file backup method. Referring to the examples illustrated in FIGS. 1 and 3, the file backup apparatus 100 selects one directory from a plurality of directories (300). The file backup apparatus 100 extracts directory property information of the selected directory from the memory 110 (310). The file backup apparatus 100 estimates whether a file has been changed in the selected directory based on the extracted directory property information (320). If it is estimated that a file in the selected directory has been changed, the file backup apparatus 100 backs up the selected directory (330). The file backup apparatus 100 determines whether or not the estimation changed files is carried out on each directory (340). If the estimation is not performed on all directories, the file backup apparatus 100 performs the operation 300 again. In contrast, if the estimation has been performed on each directory, the file backup apparatus 100 may further back up a directory which has not been backed up for a predefined period of time (350). Finally, the file backup apparatus 100 updates the directory property information (360). At this time, the directory property information may include backed-up directory information, intact directory information (i.e., for a directory which has not been backed up yet), and backed-up time information.

If it is estimated that a file included in a directory has not been changed, and the file backup apparatus 100 does not back up the directory, the file backup apparatus 100 updates information about the directory which is not backed up (360).

Each time the file backup apparatus 100 estimates that a directory has its file changed, the file backup apparatus 100 backs up the directory.

According to the above file backup method, a target directory to be backed up is searched for on a directory-by-directory basis, and thus searching time for directories to be backed up can be reduced.

Figure 4:
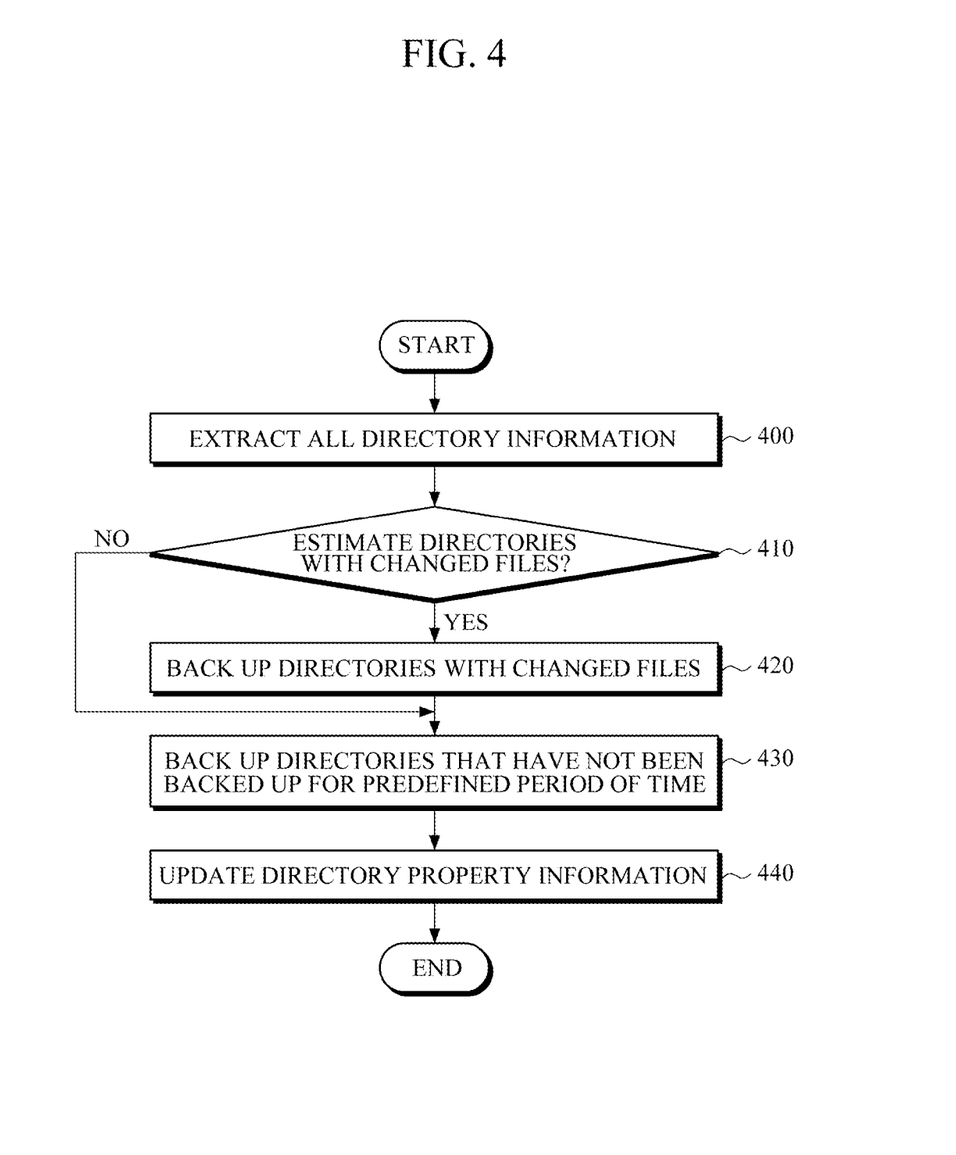
FIG. 4 is a flowchart illustrating of another example of the file backup method.

FIG. 4 illustrates a flowchart of another example of the file backup method. Referring to the examples illustrated in FIGS. 1 and 4, the file backup apparatus 100 extracts directory property information from the memory 110 (400). The file backup apparatus 100 estimates whether a file has been changed in a directory based on the directory property information (410). The file backup apparatus 100 backs up directories that are estimated to have their files changed (420). For example, if the file backup apparatus 100 estimates that a file has been changed in a first directory and a third directory when there are the first, a second, and the third directories, the file backup apparatus 100 may back up the first directory and the third directory. The file backup apparatus 100 may also back up directories that have not been backed up for a predefined period of time (430). Finally, the file backup apparatus 100 updates the directory property information (440). The directory property information may include backed-up directory information, directory information for directories that have not been backed up yet, and backed-up time information.

If it is estimated that a file in a directory has not been changed, and the file backup apparatus 100 does not back up the directory, the file backup apparatus 100 updates information about the directory which is not backed up (440).

As described above, the file backup apparatus 100 may estimate whether a file has been changed in each directory, and back up all directories that are estimated to have their files changed.

In the above file backup method, a target directory to be backed up is searched for on a directory-by-directory basis, and thus the searching time for directories to be backed up can be reduced.

Figure 5A:
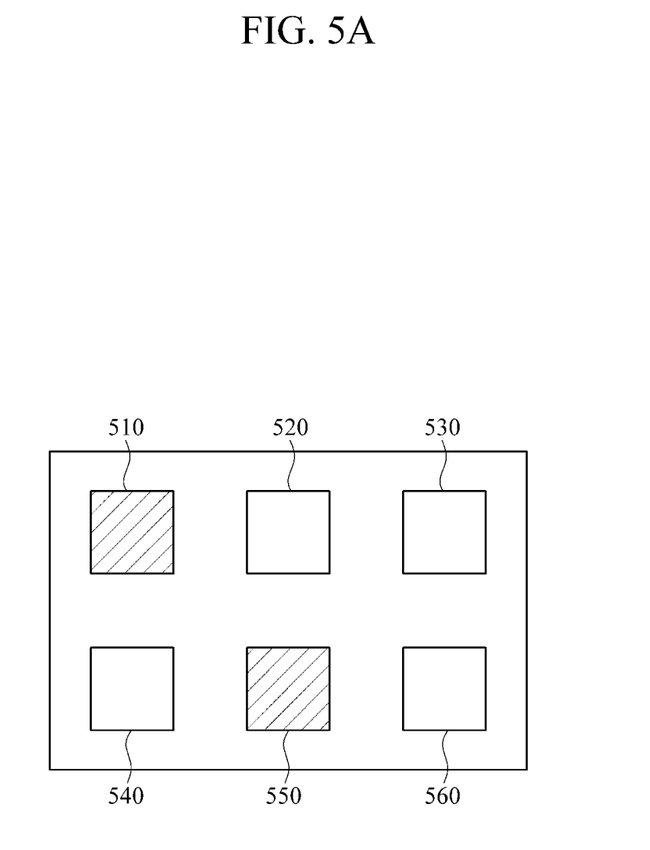
FIGS. 5A to 5C are diagrams illustrating an example of a memory, with respect to how the backup unit 130 illustrated in FIG. 1 backs up a directory which has not been backed up within a predefined period of time.
Figure 5B:
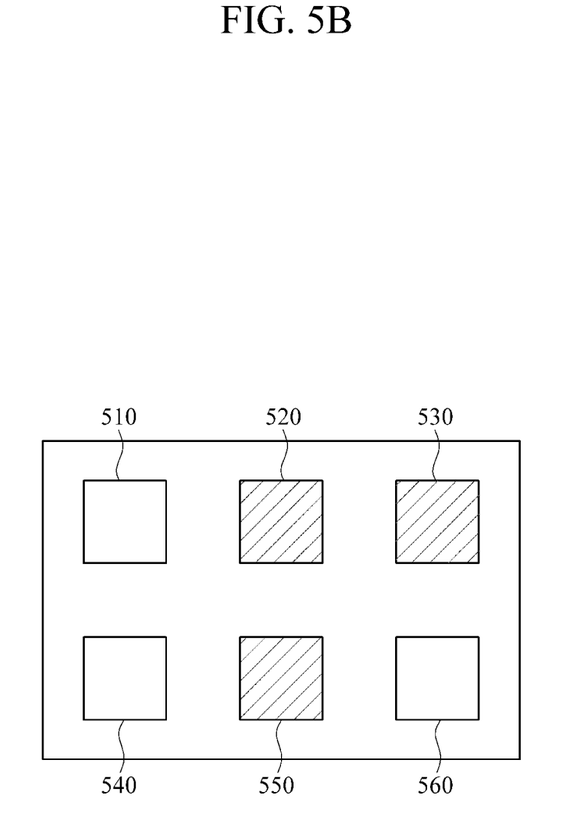
Figure 5C:
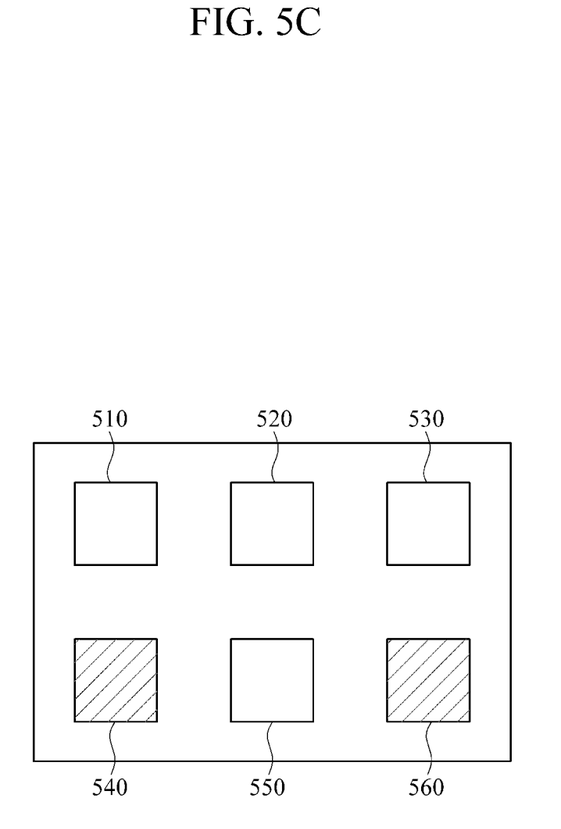

FIGS. 5A to 5C illustrate an example of a memory, with respect to how the backup unit 130 illustrated in FIG. 1 backs up a directory which has not been backed up within a predefined period of time.

In the example illustrated in FIGS. 5A to 5C, operation of the backup unit 130 is described according to an example where a backup interval is one day and the predefined time period for backing up the directory which has not been backed up is two days.

Referring to the examples illustrated in FIGS. 1 and 5A, the memory 110 may store six directories 510, 520, 530, 540, 550, and 560. The estimation unit 120 estimates whether a file has been changed in each directory based on directory property information. For example, if the estimation unit 120 estimates that a file has been changed in the first directory 510 and the fifth directory 550, the backup unit 130 backs up the first directory and the fifth directory. The update unit 140 updates time information on when the backup was performed.

Referring to the examples illustrated in FIGS. 1 and 5B, if the estimation unit 120 estimates on the next day that a file has been changed in the second directory 520, the third directory 530, and the fifth directory 550, the backup unit 130 backs up the second directory 520, the third directory 530, and the fifth directory 550. The update unit 140 updates the time information on when the backup was performed.

Referring to the examples illustrated in FIGS. 1 and 5C, if the estimation unit 120 estimates on the next day after the backup illustrated in FIG. 5B that no file has been changed in any directories, the backup unit 130 does not back up directories according to changed files. However, the backup unit 130 may determine a directory which has not been backed up for a predefined period of time based on the updated directory property information. For example, the backup unit 130 may determine that directories 540 and 560 have not been backed up for two days (the predefined period of time in this example), and back up directories 540 and 560 accordingly.

Thus, the file backup apparatus backs up directories that have not been backed up for a predefined period of time, and hence can prevent the directory from being excluded from backup process indefinitely.

The processes, functions, methods and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A file backup apparatus for backing up one or more directories comprising:
    an estimation unit configured to estimate whether a particular file has been changed in a particular directory based on directory property information of all directories accessible by the estimation unit, wherein each accessible director contains one set of directory property information specific to that accessible directory; and
    a backup unit configured to select the entire particular directory for backing up in response to the particular directory being estimated to have the particular file changed, wherein
    the estimation unit, the backup unit, or any combination thereof is implemented by at least one computer processor, and
    the estimation unit is further configured to access all the accessible directories and estimate whether at least a file has been changed in all the accessible directories prior to the backup unit selecting the directories to be backed up; wherein
    the backup unit is further configured to back up a directory in response to the directory not having been selected to be backed up and not having been backed up for a predefined period of time.

2. The file backup apparatus of claim 1, further comprising:
    an update unit configured to update the directory property information.

3. The file backup apparatus of claim 1, wherein, each time the estimation unit estimates that any file is changed in any directory, the backup unit backs up the directory which is estimated to have its file changed.

4. The file backup apparatus of claim 1, wherein the estimation unit is further configured to estimate whether any file has been changed in each accessible directory, and the backup unit is further configured to back up directories that are estimated to have their files changed.

5. The file backup apparatus of claim 1, wherein the directory property information includes at least one selected from the group of directory access information, information about a change of the directory's name or location, directory backup history information, and any combination thereof.

6. The file backup apparatus of claim 1, wherein the estimation unit estimates whether the at least one file has been changed, one directory at a time.

7. A file backup method for backing up one or more directories comprising:
    estimating within all accessible directories whether a particular file has been changed in a particular directory based on directory property information, wherein each accessible directory contains one set of director property information specific to that accessible directory; and
    backing up the entire particular directory in response to the particular directory being estimated to have the particular file changed, wherein
    the estimating operation, the backing up operation, or any combination thereof is implemented by at least one computer processor, and
    the estimating further comprises accessing all the accessible directories and estimating whether at least a file has been changed in all the accessible directories, prior to selecting the particular directory to be backed up;
    wherein the method further comprises backing up a directory in response to the directory not having been selected to be backed up and not having been backed for a predefined period of time.

8. The file backup method of claim 7, further comprising updating the directory property information.

9. The file backup method of claim 7, wherein the backing up further comprises backing up any directory each time the directory is estimated that any file in the directory has been changed.

10. The file backup method of claim 7, wherein the estimating further comprises estimating whether any file has been changed in each accessible directory, and the backing up further comprises backing up directories that are estimated to have their files changed.

11. The file backup method of claim 7, wherein the directory property information includes at least one selected from the group of directory access information, information about a change of the directory's name or location, directory backup history information, and any combination thereof.

12. A non-transitory computer-readable storage medium having stored thereon executable instructions which when executed b at least a computer processor implements a method for backing up one or more directories, comprising:
    estimating within all accessible directories whether a particular file has been changed in a particular directory based on director property information, wherein each accessible directory contains one set of directory property information specific to that accessible directory; and
    selecting the entire particular directory for backing up in response to the particular director being estimated to have the articular file changed, wherein
    the estimating operation, the backing up operation, or an combination hereof is implemented by at least one computer processor, and
    the estimating further comprises accessing all the accessible directories and estimating whether at least a file has been changed in all the accessible directories, prior to selectin the particular director to be backed up,
    wherein the instructions are further configured to back up a directory in response to the directory not having been selected to be backed up and not having been backed up for a redefined period of time.

13. The medium of claim 12, further comprising:
    updating the directory property information.

14. The medium of claim 12, wherein the directory property information includes at least one selected from the group of directory access information, information about a change of the directory's name or location, directory backup history information, and any combination thereof.

* * * * *